(12) United States Patent
Austin et al.

(10) Patent No.: US 10,346,795 B2
(45) Date of Patent: Jul. 9, 2019

(54) ARRANGEMENT FOR, AND METHOD OF, RETRIEVING ITEMS ASSOCIATED WITH RADIO FREQUENCY (RF) IDENTIFICATION (RFID) TAGS SEQUENTIALLY ARRANGED IN A LIST

(71) Applicant: SYMBOL TECHNOLOGIES, LLC, Lincolnshire, IL (US)

(72) Inventors: Timothy B. Austin, Stony Brook, NY (US); Mary Jo Serrino, Lawrence, PA (US); Susan Flake, Valencia, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 16 days.

(21) Appl. No.: 15/382,885

(22) Filed: Dec. 19, 2016

(65) Prior Publication Data

US 2018/0173910 A1 Jun. 21, 2018

(51) Int. Cl.
*G06Q 10/08* (2012.01)
(52) U.S. Cl.
CPC .................................. *G06Q 10/087* (2013.01)
(58) Field of Classification Search
CPC ... G06K 2017/0051; G06K 2017/0074; G06K 17/00; G06K 19/07796; G06K 17/0029; G06K 2017/0045; G06Q 10/08; G08B 13/2462
See application file for complete search history.

(56) References Cited

U.S. PATENT DOCUMENTS

| | | | | |
|---|---|---|---|---|
| 7,916,028 | B2 * | 3/2011 | Oberle | G06Q 10/087 235/385 |
| 9,451,674 | B1 * | 9/2016 | Kong | H05B 37/029 |
| 2006/0180665 | A1 * | 8/2006 | Garber | G06K 7/0008 235/385 |
| 2009/0081008 | A1 * | 3/2009 | Somin | G06Q 50/24 414/222.07 |
| 2009/0099943 | A1 * | 4/2009 | Bodin | G06Q 10/08 705/28 |
| 2009/0223872 | A1 * | 9/2009 | Robbins | B07C 3/00 209/3.3 |
| 2013/0099901 | A1 * | 4/2013 | Jones | G06K 17/0029 340/10.51 |
| 2014/0279294 | A1 * | 9/2014 | Field-Darragh | G06Q 10/087 705/28 |

* cited by examiner

*Primary Examiner* — Mirza F Alam
(74) *Attorney, Agent, or Firm* — Yuri Astvatsaturov (57) ABSTRACT

Items associated with radio frequency (RF) identification (RFID) tags sequentially arranged in a list are to be retrieved from a venue. A mobile RFID tag reader is jointly movable with an operator. The reader is controlled to non-sequentially read the tags from the list. The operator is guided to find any one of the items by reading the tag associated with the any one item. The operator is prompted to retrieve the any one item and to remove the associated tag from the list. The guiding operation to the any one item is discontinued after retrieval of the one item. The guiding operation, the prompting operation, and the discontinuing operation are repeated for any others of the items from the list in a non-ordered sequence.

14 Claims, 6 Drawing Sheets

ARRANGEMENT FOR, AND METHOD OF, RETRIEVING ITEMS ASSOCIATED WITH RADIO FREQUENCY (RF) IDENTIFICATION (RFID) TAGS SEQUENTIALLY ARRANGED IN A LIST

BACKGROUND OF THE INVENTION

The present disclosure relates generally to an arrangement for, and a method of, retrieving items associated with radio frequency (RF) identification (RFID) tags sequentially arranged in a list.

Radio frequency (RF) identification (RFID) technology is becoming increasingly important for logistics concerns, material handling and inventory management in retail stores, warehouses, distribution centers, buildings, and like venues. An RFID reader, also known as an interrogator, may be held and operated by an operator walking about a venue to interrogate and read any RFID item tags in its coverage range. Each item tag is usually attached to, or associated with, an individual item, or to a package for the item, or to a pallet or container for supporting or containing multiple items. Each item tag typically includes a tag antenna for receiving and/or transmitting RF waves, and an integrated circuit chip that typically has a power management section, a radio section, and frequently a logic section containing a control microprocessor, a memory, or both. The RFID reader transmits an RF interrogating signal, and each item tag, which senses the interrogating signal with its tag antenna, responds by transmitting an RF return signal from its tag antenna. The item tag either generates the return signal originally, or reflects back a portion of the interrogating signal in a process known as backscatter. The return signal or payload may be decoded into data, such as a tag identification (ID), by the reader and/or by a host server that is in communication with the reader. The decoded data identifies, counts, or otherwise interacts with the associated item.

In such venues, it is sometimes necessary to retrieve a plurality of RFID-tagged items from a list. For example, the list could be a shopping list, also known as a pick list, of RFID-tagged items ordered by a customer; or a list of perishable RFID-tagged items that are past their expiration dates; or a list of RFID-tagged items that have not been read for a long time, but also have not been seen departing the venue; or a list of RFID-tagged items thought to be stolen; or a list of RFID-tagged items that have recently been moved onto a sales floor; or, in brief, any list or compilation of RFID-tagged items that are deemed to be of interest. To retrieve the RFID-tagged items from the list using the handheld RFID reader, the operator must walk through the venue until the first RFID-tagged item on the list is found and read, and then continue walking through the venue until the second RFID-tagged item on the list is found and read, and so on for each RFID-tagged item on the list in sequential numerical order.

However, this retrieval method has proven to be a very time-consuming, laborious, and inefficient process. The operator must first walk through the venue during a first pass to hunt for, and find, the first RFID-tagged item on the list, and then either backtrack or continue walking through the venue during a second pass to hunt for, and find, the second RFID-tagged item on the list, and then repeat these actions during multiple passes to hunt for, and find, the remaining RFID-tagged items on the list in sequential order. During each pass, the operator is effectively blind, because he/she does not know if he/she is currently near the next RFID-tagged item on the list, or whether the operator has walked past and bypassed other RFID-tagged items that are located further down the list, thereby requiring the operator to return one or more times to retrieve the bypassed RFID-tagged items. The larger the venue, the higher the inefficiency, and the more laborious and time-consuming is the retrieval process.

Accordingly, it would be desirable to reduce the time and labor involved in retrieving all the RFID-tagged items from a list, and to increase the efficiency of the retrieval method, by non-sequentially reading the tags from the list in a non-ordered sequence.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for retrieving items associated with radio frequency (RF) identification (RFID) tags sequentially arranged in a list. The arrangement includes a mobile RFID tag reader operable by an operator, and jointly movable with the operator, during movement of the operator in a venue in which the items to be retrieved are located, and a control system for controlling the reader to non-sequentially read the tags from the list. The control system also guides the operator during the movement of the operator to find any one of the items by reading the tag associated with the any one item, prompts the operator to retrieve the any one item and to remove the associated tag from the list, and discontinues the guiding operation to the any one item after retrieval of the one item. The guiding operation, the prompting operation, and the discontinuing operation are repeated for any others of the items from the list in a non-ordered sequence.

Preferably, the RFID reader has an actuatable annunciator, e.g., an auditory beeper and/or a visible light source. The control system may guide the operator by actuating the beeper to emit a sound having a variable amplitude or loudness and/or a variable frequency or pitch, and/or by actuating the light source to emit a visible light having a variable intensity or brightness and/or a variable frequency or blink rate. For example, the emitted sound can get louder in volume and/or higher in pitch, and/or the emitted light can get brighter in intensity and/or faster in blink rate, as the operator approaches each item to be retrieved, thereby assisting the operator in locating the item when the sound is loudest or of highest pitch, and/or when the light is brightest or fastest in blink rate.

Advantageously, the control system displays the list on a display on the RFID reader, and the control system reorders the list by moving the tag associated with the any one item to a top rank of the list, and by removing the any one tag from the top rank of the list after retrieval of the any one item by actuating a manual control on the RFID reader. The control system may prioritize any tags on the list that are concurrently read by the reader in a predetermined period of time based on such factors as return signal strength intensity (RSSI), read rate, time from last read, etc. The RFID reader has a device controller for controlling its operation, and a host server is in communication with the RFID reader for also controlling reader operation. The control system is constituted by the device controller and/or the host server. The list may be uploaded to the RFID reader by the host server. Alternatively, the RFID reader may include a bar code symbol reader, and the list may be uploaded to the reader by reading a plurality of bar code symbols indicative of the RFID-tagged items in the list.

Another aspect of this disclosure relates to a method of retrieving items associated with radio frequency (RF) identification (RFID) tags sequentially arranged in a list. The method is performed by moving and operating a mobile RFID tag reader by an operator moving in a venue in which the items to be retrieved are located, by controlling the reader to non-sequentially read the tags from the list, by guiding the operator during movement of the operator to find any one of the items by reading the tag associated with the any one item, by prompting the operator to retrieve the any one item and to remove the associated tag from the list, and by discontinuing the guiding operation to the any one item after retrieval of the one item. The guiding operation, the prompting operation, and the discontinuing operation are repeated for any others of the items from the list in a non-ordered sequence.

In accordance with this disclosure, the tags from the list are non-sequentially read in a non-ordered sequence. It is no longer necessary to initially hunt for, and find, the RFID-tagged item that is ranked first on the list, and to then hunt for, and find, the RFID-tagged item that is ranked second on the list, and so on, in numerical sequential order. In other words, any RFID-tagged item on the list, no matter on which rank it appears on the list, may be found and read as the reader approaches that item, and successive RFID-tagged items are, in turn, found and read as the reader approaches them no matter on which rank each successive item appears on the list. Thus, the time and labor involved in performing the retrieval is decreased, and the efficiency of the retrieval is increased, because the operator does not need to make multiple passes through the venue, or to backtrack through the venue multiple times, to retrieve all the RFID-tagged items on the list. In some cases, a single pass may be all that is necessary.

Figure 1:
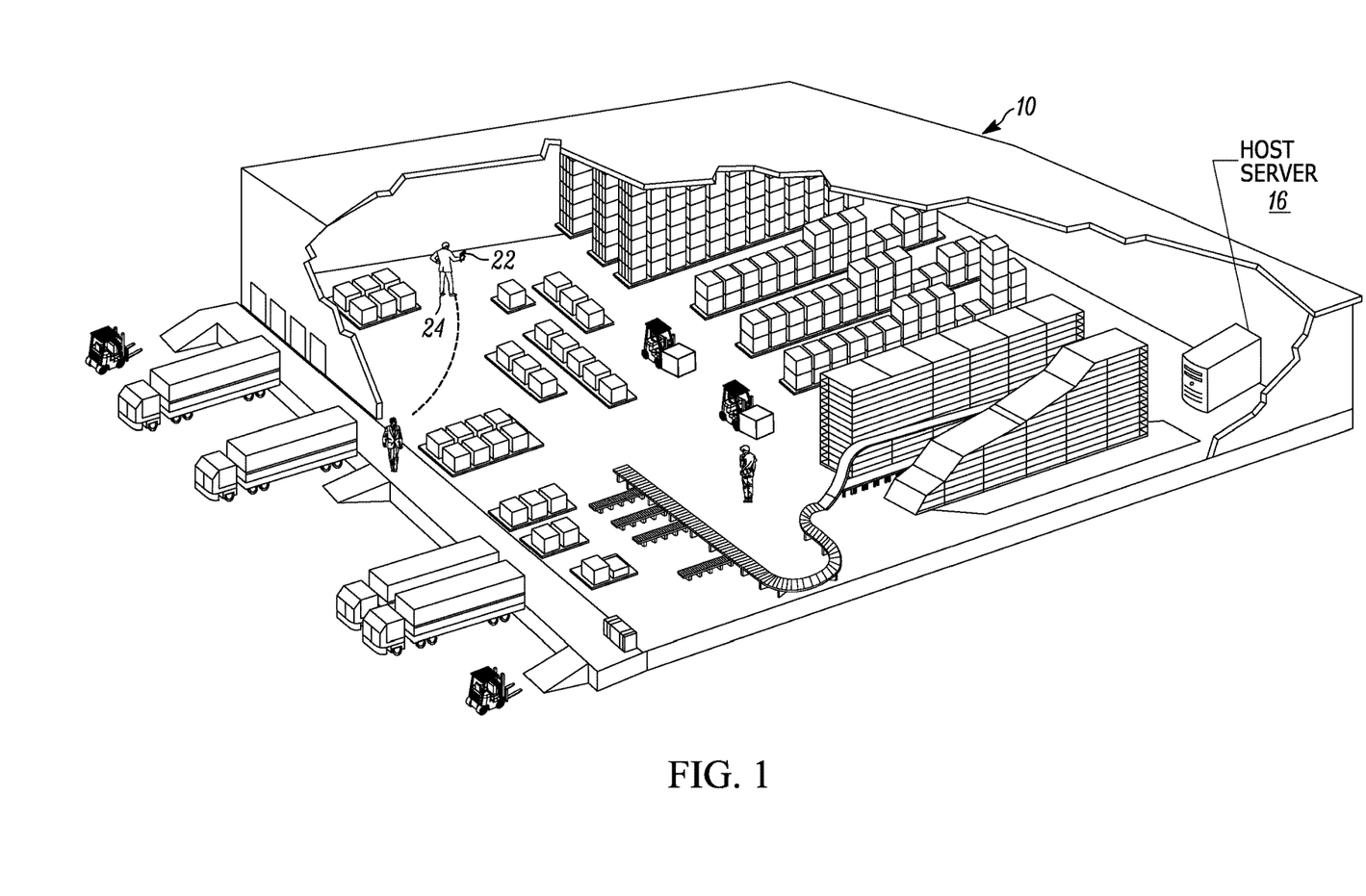
FIG. 1 is a broken-away, perspective view, as seen from above, of an arrangement for retrieving items associated with radio frequency (RF) identification (RFID) tags arranged in a list by having an operator hold and operate a mobile RFID reader while walking in a venue, such as a warehouse, in accordance with the present disclosure.

Turning now to the drawings, reference numeral 10 in FIG. 1 generally depicts a venue, which is shown as a warehouse, but can be any environment, such as a retail store, a factory, a distribution center, a building, or a like indoor or outdoor controlled area. The venue 10 may have any layout or configuration. A handheld, mobile radio frequency (RF) identification (RFID) tag reader 22 is held or worn by, is operated by, and is jointly movable with, an operator 24, e.g., any person, employee, user, or associate authorized to operate the mobile RFID reader 22, while moving or walking through the venue 10. A plurality of items, e.g., items 1-10 as depicted in FIGS. 2-5, is located in the venue 10. Each item is preferably tagged with an RFID item tag 100 (see FIG. 2), preferably a passive RFID tag for cost reasons, and, in some applications, each item tag 100 may be associated with, or attached to, a package for the items, or pallets or containers for supporting or containing the items. The RFID reader 22 is operative for reading the RFID item tags 100 associated with, or attached to, the items 1-10, each item tag 100 having a readable payload containing a tag identification (ID) that identifies the tagged item. The tag ID may have a non-serialized portion and a serialized portion to uniquely identify the item. The RFID reader 22 is powered by a battery 28 (see FIG. 5) for wireless operation with full freedom of movement throughout the venue 10.

A network computer or host server 16, typically locally located, as shown in FIG. 1, in a backroom at the venue 10, comprises one or more computers and is in wired, wireless, direct, or networked communication with the RFID reader 22. The host server 16 may also be remotely hosted in a cloud server. The host server 16 may include a wireless RF host transceiver 18 (see FIG. 5) that communicates with a wireless RF device transceiver 40 in the RFID reader 22. For example, Wireless Fidelity (Wi-Fi) and Bluetooth® are open wireless standards for exchanging data between electronic devices. The host server 16 controls the RFID reader 22. Although FIG. 1 depicts only one RFID reader 22 held by one operator 24, it will be understood that more than one RFID reader 22 operated by more than one operator 24 may be present in the venue 10, in which case, the host server 16 controls each RFID reader 22.

Figure 2:
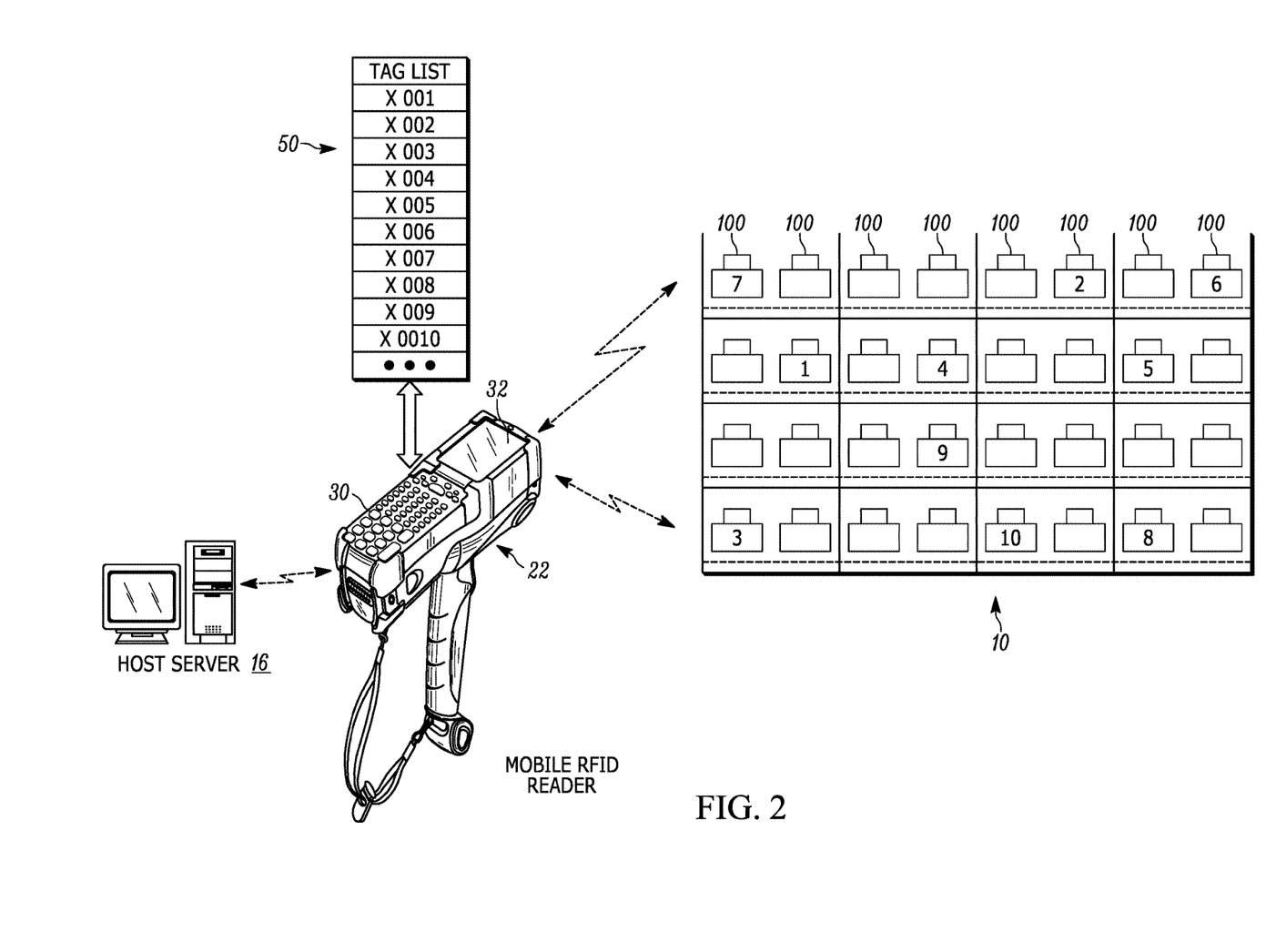
FIG. 2 is an enlarged, perspective view of the mobile RFID reader of FIG. 1 for non-sequentially reading a plurality of RFID-tagged items, together with a pictorial depiction of the list uploaded by a host server.

As previously described, it is sometimes necessary to retrieve a plurality of RFID-tagged items 1-10 from a list 50 (see FIG. 2). For example, the list 50 could be a shopping list, also known as a pick list, of RFID-tagged items ordered by a customer; or a list of perishable RFID-tagged items that are past their expiration dates; or a list of RFID-tagged items that have not been read for a long time, but also have not been seen departing the venue; or a list of RFID-tagged items thought to be stolen; or a list of RFID-tagged items that have recently been moved onto a sales floor; or, in brief, any list or compilation of RFID-tagged items that are deemed to be of interest. The list 50 may be uploaded to the RFID reader 22 by the host server 16. As shown in FIG. 2, the RFID-tagged items 1-10 are distributed at multiple locations in the venue 10. This disclosure is directed to retrieving the RFID-tagged items 1-10 from the list 50 quickly, easily, and efficiently.

Figure 3:
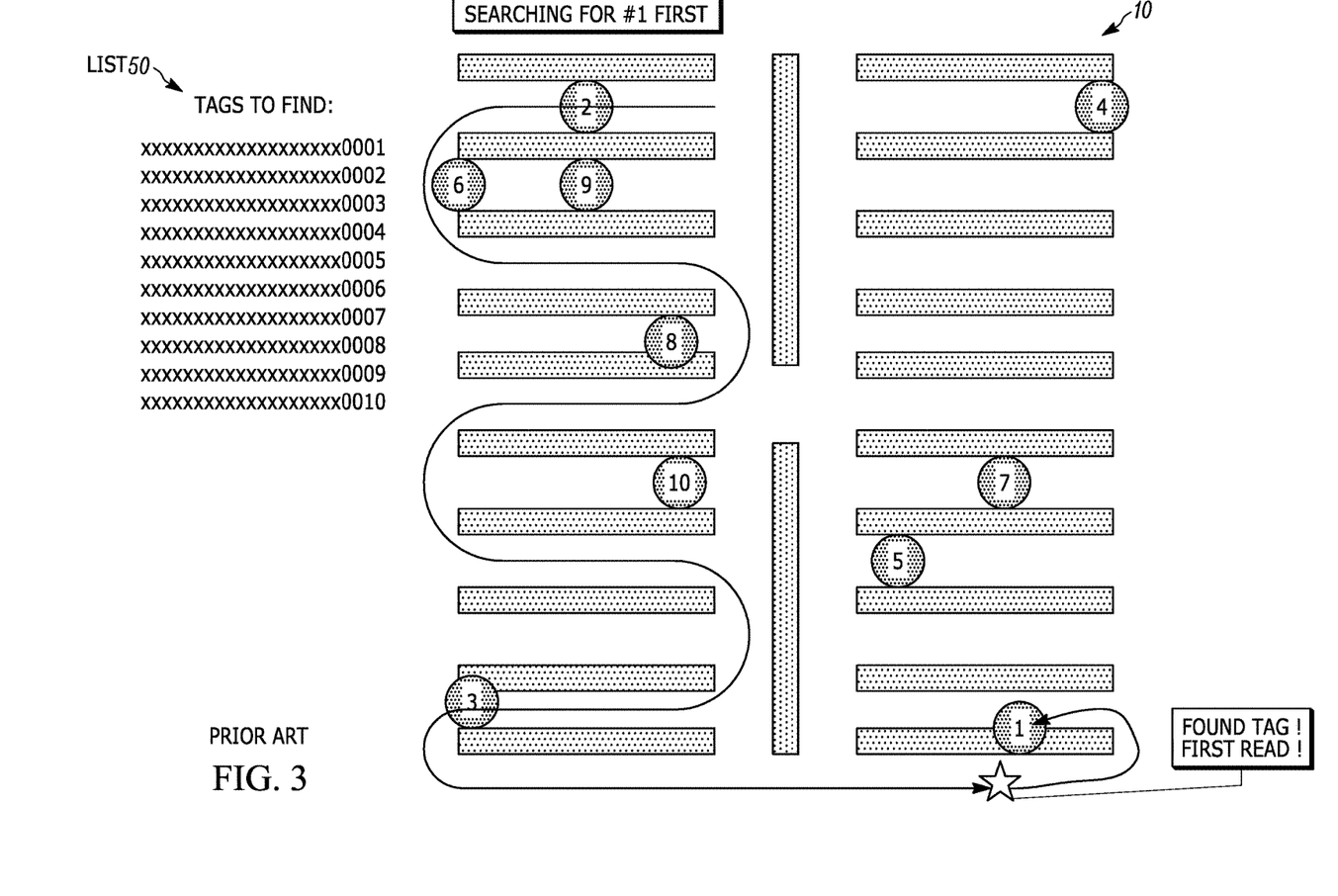
FIG. 3 is a simplified, explanatory diagram of how a search and retrieval of RFID-tagged items on a list is performed in accordance with the prior art.

FIG. 3 depicts one possible example of how the RFID-tagged items 1-10 from the list 50 are found and retrieved using the handheld RFID reader 22 in accordance with the known prior art. According to the list 50, the operator 24 must begin by walking through the venue 10 until the first RFID-tagged item 1 on the list 50 is found and read. The operator 24 does not know where the item 1 is, and hence must keep walking along a route until the item 1 is eventually found. The route taken can be circuitous and maze-like, as shown in FIG. 3. It will be noted in this example that during this hunt for the item 1, other items 2, 6, 9, 8, 10, and 3 have been bypassed and have not been retrieved, because they are all ranked lower down on the list 50. Once the item 1 has been found and retrieved, the operator 24 must again walk through the venue 10 until the second RFID-tagged item 2 on the list 50 is read. Again, the operator 24 does not know where the item 2 is, and hence must keep walking either forwardly or backtracking along another route until the item 2 is eventually found. Depending on the route taken, other items that are ranked lower down the list are again bypassed. This process continues until all the items 1-10 have been retrieved, and the result is a very time-consuming, laborious, and inefficient process that is worsened as the venue 10 is larger and as the list 50 grows.

Figure 4:
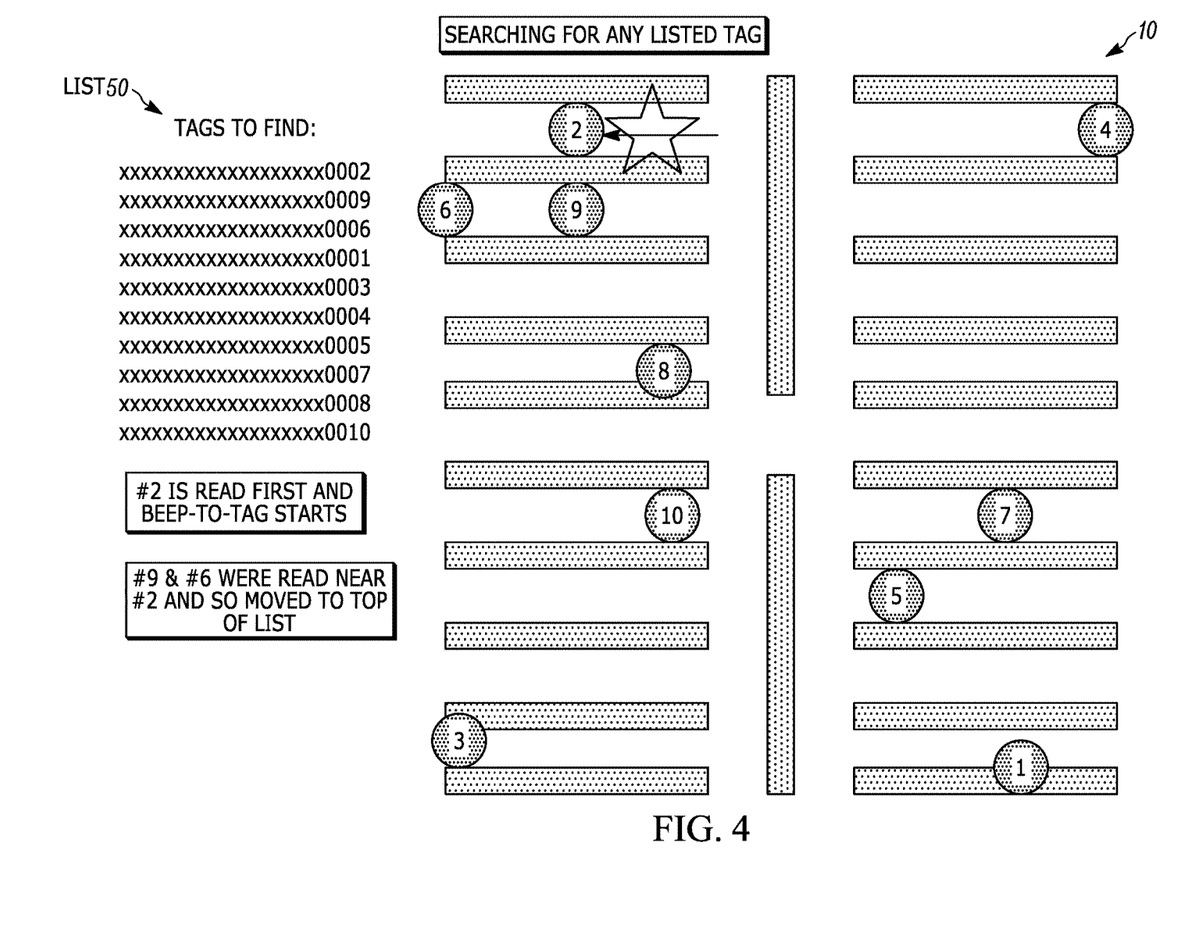
FIG. 4 is a view analogous to FIG. 3, but of how a search and retrieval of RFID-tagged items is performed in accordance with the present disclosure.
Figure 5:
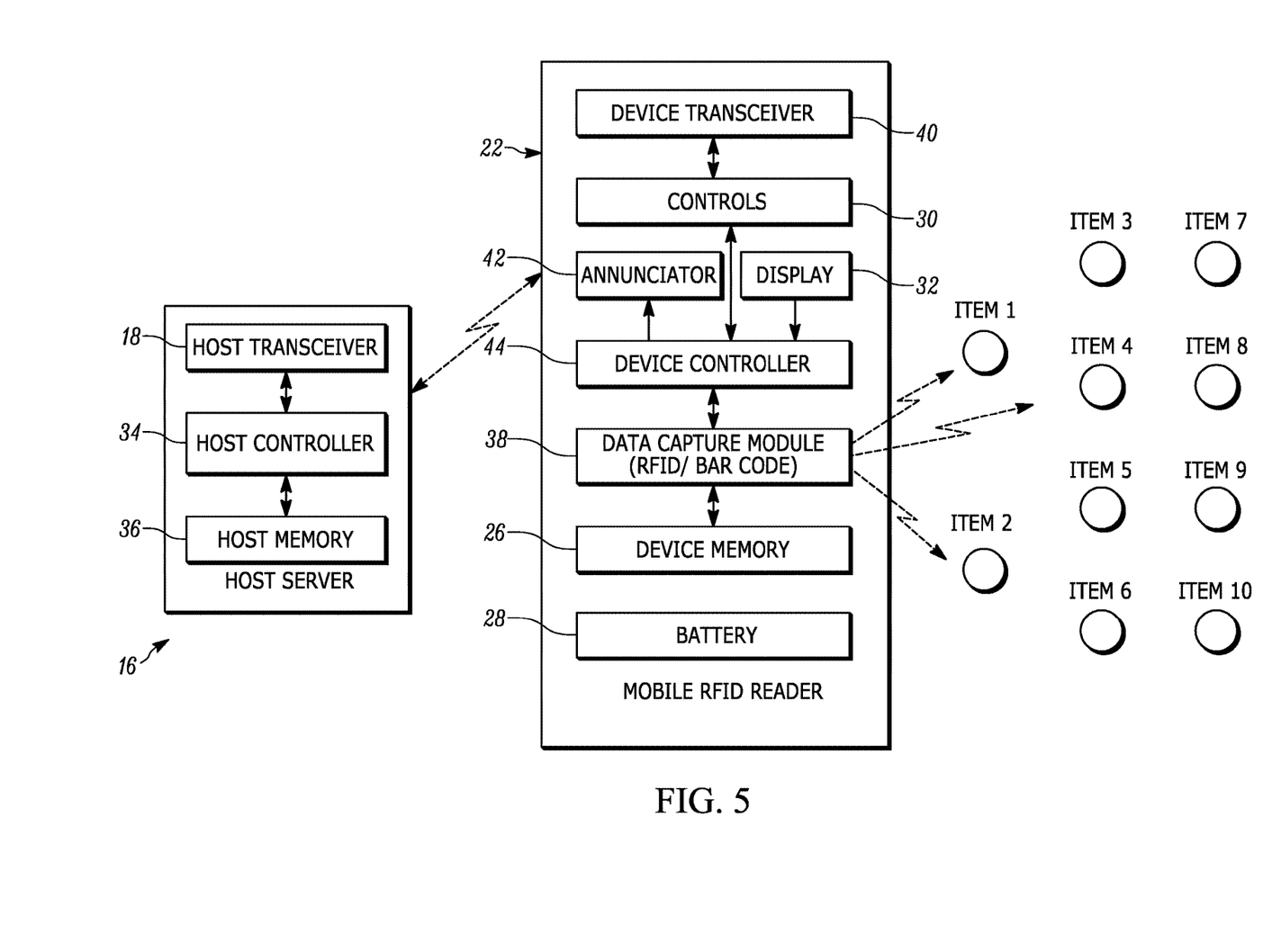
FIG. 5 is a block diagram depicting components of the mobile RFID reader and the host server of FIG. 1.

FIG. 4 is a view analogous to FIG. 3, but of how the retrieval of the RFID-tagged items 1-10 from the list 50 is performed in accordance with the present disclosure. In this illustrated example, the retrieval begins with the operator 24 walking through the venue 10 until the reader 22 finds any one of the tagged items 1-10 on the list 50. As shown in FIG. 4, the first tagged item to be found happens to be the tagged item 2, but it could have been any tagged item in the list 50. A device controller 44 (see FIG. 5) of the reader 22 controls the operation of the reader 22 and/or a host controller 34 (see FIG. 5) of the host server 16 also controls the operation of the reader 22. The controllers 34, 44 constitute a control system operative for controlling the reader 22 to non-sequentially read the tagged items 1-10 from the list 50 in any non-ordered sequence. Advantageously, the control system displays the list 50 on a display 32 on the RFID reader 22, and the control system reorders the list 50 by moving the tag associated with the item 2 to a top rank of the list 50, as shown in FIG. 4.

Once the tagged item 2 is found by the reader 22, the control system also guides the operator 24 to retrieve the tagged item 2. Preferably, the RFID reader 22 has an actuatable annunciator 42, e.g., an auditory beeper and/or a visible light source. The control system may guide the operator 24 by actuating the beeper to emit a feedback signal or a sound having a variable amplitude or loudness and/or a variable frequency or pitch, and/or by actuating the light source to emit a feedback signal or a visible light having a variable intensity or brightness and/or a variable frequency or blink rate. For example, the emitted sound can get louder in volume and/or higher in pitch as the operator 24 approaches each tagged item to be retrieved. This so-called "beep-to-tag" mode of operation may be considered analogous to the action of a Geiger counter that produces more and faster audible clicks as it approaches and detects radiation. As another example, the emitted light can get brighter in intensity and/or faster in blink rate, as the operator 24 approaches each tagged item to be retrieved in a so-called "blink-to-tag" mode of operation. In either case, the operator 24 is affirmatively assisted by such feedback in locating the item when the sound is loudest or of highest pitch, and/or when the light is brightest or fastest in blink rate. Thus, in the illustrated example, the item 2 is retrieved first.

Once the tagged item 2 has been retrieved, the control system next prompts the operator 24 to remove the tag of the retrieved item 2 from the list 50 by actuating a manual control 30, such as a button or key, on the RFID reader 22. The list 50 may appear on the display 32 to assist the operator 24 in removing the tag. The control system also discontinues the guiding operation to the tagged item 2, e.g., either the beep-to-tag mode or the blink-to-tag mode, after retrieval of the tagged item 2. Thus, once the tagged item 2 has been retrieved, the annunciator 42 is deactuated, e.g., the beeper is silenced, and/or the light source is extinguished. The guiding operation, the prompting operation, and the discontinuing operation are repeated for any others of the items from the list 50 in a non-ordered sequence. Thus, in FIG. 4, a single pass through the venue 10 may be all that is necessary to retrieve all the tagged items 1-10.

At the same time that the item 2 was found, the items 9 and 6 were concurrently found by the reader 22, because they were in its relatively long coverage range. The control system may prioritize any tags on the list that are concurrently being read by the reader 22 in a predetermined period of time based on such factors as return signal strength intensity (RSSI), read rate, time from last read, etc. In the illustrated example of FIG. 4, the item 9 has a higher RSSI than the item 6, and hence, the tag associated with the item 9 is moved to the next rank on the list 50, followed by the tag associated with the item 6, as shown in FIG. 4. The control system guides the operator 24 to retrieve the tagged items 9 and 6, again by the above-described action of the annunciator 42.

As previously mentioned, the list 50 may be uploaded to the RFID reader 22 by the host server 16. The list 50 may be stored in the host memory 36 (see FIG. 5) and uploaded into the reader 22 for storage in the device memory 26 (see FIG. 5). The RFID reader 22 has a data capture module 38 for containing the electronics for reading the RFID tags. The data capture module 38 may also include a bar code symbol reader, in which case, the list 50 may alternatively be uploaded to the reader 22 by reading a plurality of bar code symbols indicative of the RFID-tagged items 1-10 in the list 50.

Figure 6:
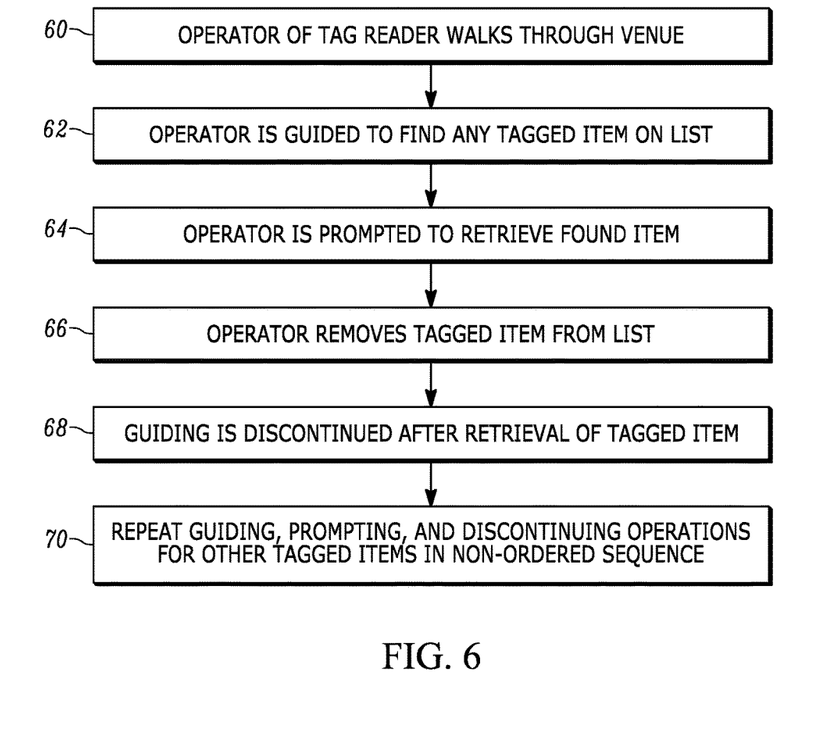
FIG. 6 is a flow chart depicting steps performed in accordance with the method of the present disclosure.

The flow chart of FIG. 6 depicts the steps performed in the method of operation. In step 60, in a general mode of operation, the operator 24 walks through the venue 10 and operates the reader 22 until any one of the RFID-tagged items in the list 50 has been found and read. The list 50 has already been uploaded. Preferably, the EPC global UHF Generation 2 air protocol interface standard is used to read the found tag. The control system controls the reader 22 to enter the aforementioned beep-to-tag mode and/or the blink-to-tag mode to guide the operator 24 to the location of the found RFID-tagged item in step 62. In step 64, the operator 24 is prompted to retrieve the found RFID-tagged item. In step 66, the operator 24 is prompted to remove the found RFID-tagged item from the list 50. After retrieval of the found RFID-tagged item, the beep-to-tag mode and/or the blink-to-tag mode is discontinued in step 68. In step 70, the operator 24 then resumes walking through the venue 10 and operates the reader 22 until another of the RFID-tagged items in the list 50 has been found and read. Again, this other item can be ranked anywhere on the list 50. The operator 24 is again guided to this other item by the control system again controlling the reader 22 to enter the beep-to-tag mode and/or the blink-to-tag mode. The operator 24 is again prompted to retrieve the other item and to remove the other item from the list 50. The beep-to-tag mode and/or the blink-to-tag mode is again discontinued until the next tagged item is found. This process repeats until all the items have been retrieved.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for retrieving items associated with respective tag identification (ID) data encoded in radio frequency (RF) identification (RFID) tags, the tag ID data being sequentially arranged in a list, the arrangement comprising:
   a mobile RFID tag reader operable by an operator and jointly movable with the operator during movement of the operator in a venue in which the items to be retrieved are located; and
   a control system for controlling the reader to non-sequentially read the tag ID data from the list, for guiding the operator through the venue during the movement of the operator through the venue to find any one of the items by reading the tag associated with the any one item, for prompting the operator to retrieve the any one item and to remove the associated tag ID data from the list, for discontinuing the guiding operation to the any one item after retrieval of the one item, and for repeating the guiding operation, the prompting operation, and the discontinuing operation for any others of the items from the list in a non-ordered sequence,
   wherein the reader is a handheld reader having manual controls that are actuatable by the operator, and a display that is viewable by the operator,
   wherein the control system is operative for displaying the list on the display, and wherein the control system reorders the list by moving the tag ID data associated with the any one item to a top rank of the list, and by removing the any one tag ID data from the top rank of the list after retrieval of the any one item by actuating at least one of the manual controls, and wherein the control system is operative for prioritizing any tag ID data of any of the tags on the list that are concurrently read by the reader in a predetermined period of time.

2. The arrangement of claim 1, wherein the reader has an actuatable annunciator, and wherein the control system guides the operator by actuating the annunciator to emit a variable feedback signal indicative of a location of each item.

3. The arrangement of claim 2, wherein the annunciator is an auditory beeper for emitting the feedback signal as a sound having at least one of variable amplitude and variable frequency.

4. The arrangement of claim 2, wherein the annunciator is a visible light source for emitting the feedback signal as a light having at least one of variable intensity and variable frequency.

5. The arrangement of claim 1, wherein the control system is operative for uploading the list to the reader.

6. The arrangement of claim 1, wherein the reader includes a bar code symbol reader, and wherein the reader is operative for uploading the list to the reader by reading a plurality of bar code symbols indicative of the tag ID data in the list.

7. The arrangement of claim 1, wherein the reader includes a device controller, and further comprising a host server in communication with the reader, and wherein the control system includes at least one of the device controller and the host server.

8. A method of retrieving items associated with respective tag identification (ID) data encoded in radio frequency (RF) identification (RFID) tags, the tag ID data being sequentially arranged in a list, the method comprising:
   moving and operating a mobile RFID tag reader by an operator moving through a venue in which the items to be retrieved are located, the reader being a handheld reader with manual controls that are actuatable by the operator, and having a display that is viewable by the operator;
   displaying the list on the display;
   controlling the reader to non-sequentially read the tag ID data from the list;
   prioritizing any tag ID data of any of the tags on the list that are concurrently read by the reader in a predetermined period of time;
   guiding the operator during movement of the operator through the venue to find any one of the items by reading the tag associated with the any one item;
   prompting the operator to retrieve the any one item and to remove the associated tag ID data from the list;
   discontinuing the guiding operation to the any one item after retrieval of the one item;
   reordering the list by moving the tag ID data associated with the any one item to a top rank of the list, and by removing the any one tag ID data from the top rank of the list after retrieval of the any one item by actuating at least one of the manual controls; and
   repeating the guiding operation, the prompting operation, and the discontinuing operation for any others of the items from the list in a non-ordered sequence.

9. The method of claim 8, wherein the guiding is performed by emitting a variable feedback signal indicative of a location of each item.

10. The method of claim 9, wherein the guiding is performed by emitting the feedback signal as a sound having at least one of variable loudness and variable frequency.

11. The method of claim 9, wherein the guiding is performed by emitting the feedback signal as a visible light having at least one of variable intensity and variable frequency.

12. The method of claim 8, and uploading the list to the reader by operation of a host server.

13. The method of claim 8, and uploading the list to the reader by reading a plurality of bar code symbols indicative of the tag ID data in the list.

14. The method of claim 8, and configuring the reader with a device controller, and communicating the reader with a host server, and wherein the controlling is performed by at least one of the device controller and the host server.

* * * * *